Sept. 13, 1966 A. CSICSATKA 3,272,923
RECEIVER CIRCUIT FOR STEREO SEPARATION
Filed Dec. 31, 1963
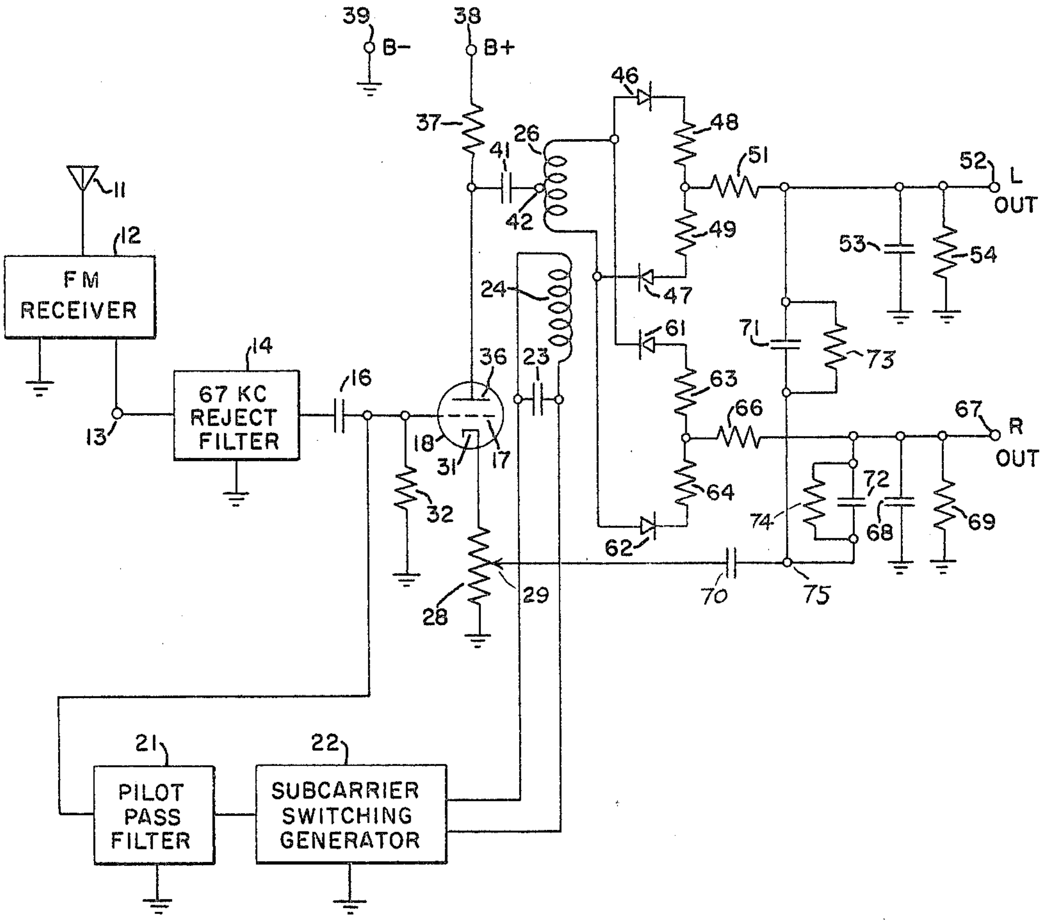
INVENTOR:
ANTAL CSICSATKA,
BY Norman C. Fulmer
HIS ATTORNEY.

United States Patent Office 3,272,923
Patented Sept. 13, 1966

3,272,923

RECEIVER CIRCUIT FOR STEREO SEPARATION

Antal Csicsatka, Utica, N.Y., assignor to General Electric Company, a corporation of New York Filed Dec. 31, 1963, Ser. No. 334,942
4 Claims. (Cl. 179—15)

This invention relates to improvements in circuits used to derive separate stereophonic signals from sum and difference combinations of these signals, such as are conveyed in accordance with the present Federal Communications Commission standards for frequency modulation stereophonic transmission. More particularly, the invention relates to circuitry for improving the separation or "purity" of the stereo signals produced in radio receivers.

In the stereo broadcasting system, audio signals L and R, which represent respectively the audio signals generated by left and right microphones, for example, are transmitted by modulating the frequency of a main carrier in accordance with the amplitude variation of the sum of the two signals, i.e., $L+R$, and the main carrier also is frequency modulated with the amplitude variations of the sideband products resulting from an amplitude modulation of a 38 kilocycle per second subcarrier with a difference combination of the two stereo signals, i.e., $L-R$. The 38 kilocycle subcarrier is suppressed so that it does not accompany the other components of the broadcast signal. A subharmonic 19 kilocycle pilot signal is transmitted, which functions as a reference signal at receivers for reconstituting the 38 kilocycle subcarrier.

The combination of the $L+R$ signal, the $L-R$ sidebands of the suppressed subcarrier, and the pilot signal, is called the "composite" signal.

In order to derive the separate L and R audio signals from the composite signal, it has heretofore been proposed, in accordance with well-known theory, that one of these signals be derived by sampling the composite signal at times corresponding to the positive excursions of the 38 kilocycle suppressed subcarrier and that the other stereo signal be derived by sampling the composite signal at times corresponding to the negative excursions of the 38 kilocycle subcarrier wave. This sampling is performed by a sampling circuit that is controlled by a 38 kilocycle switching signal derived in a switching signal generator from or under the control of the pilot signal. For example, if samples of the left stereo signal L are obtained during excursions of the switching signal corresponding in time to positive excursions of the subcarrier, then samples of the right stereo signal R are obtained during excursions of the switching signal corresponding in time to negative excursions of the subcarrier. Each of the signals L and R is then frequency de-emphasized, if they have been pre-emphasized at the transmitter (in well-known manner), so as to yield the original audio signals L and R at separate outputs for application (after amplification if desired) to separate "left" and "right" loudspeakers.

An alternative receiver circuit for deriving the L and R signals employs, instead of a time-sampling arrangement, an AM detector for deriving the $L-R$ signal from the composite signal, and a matrix circuit for combining the $L+R$ and $L-R$ signals additively and subtractively, which provides L and R output signals.

In each of the above-described types of stereo demodulators, i.e., the time-sampling type and the AM detector-matrix type, it has been difficult to obtain good stereo separation of the left and right audio output signals—i.e., the L signal is usually contaminated with a bit of undesired R signal, and the R signal is usually contaminated with a bit of undesired L signal.

In the time-sampling type of circuit, a way to improve the stereo separation, is to provide a matrix circuit for applying a slight amount of the $L+R$ signal, in proper phase, to the L and R output signals, to cancel the undesired R in the L output signal and the undesired L in the R output signal. In the AM detector-matrix stereo demodulator circuit, the circuit is carefully designed to provide a relative phase and amplitude ratio of the $L+R$ and $L-R$ signals in the matrix to provide optimum stereo separation.

In spite of the above-described efforts to improve the stereo separation, the results are not always satisfactory. If the circuits are adjusted for good stereo separation at the lower audio frequencies, then the separation is poor at the higher audio frequencies. Conversely, if the circuits are adjusted for good stereo separation at the higher audio frequencies, then the separation is poor at the lower audio frequencies. It is customary to adjust the circuits for a compromise stereo separation—i.e., the circuits are adjusted for a separation that lies between poor and good at both the high and low audio frequencies, with really good separation only at the mid-range of audio frequencies. This tends to result in mediocre and unsatisfactory stereo separation.

An object of the invention is to provide a stereo receiver circuit for achieving improved separation of the stereo output signals.

Other objects will be apparent from the following disclosure and claims, and from the drawing in which:

The single figure of the drawing is an electrical schematic diagram of a preferred embodiment of the invention.

The invention comprises, briefly and in its preferred embodiment, a stereo reception circuit having a cancellation network arrangement to apply an arithmetical combination of L and R signals ($L+R$ or $L-R$, for example) in proper phase to the L and R stereo output signals to achieve cancellation of the undesired R and L components, respectively, in these output signals, the cancellation network arrangement having the characteristic of passing signal components in the higher-frequency audio range with relatively greater amplitude than signal components in the lower-frequency audio range, thereby achieving relatively complete cancellation of the undesired R and L components and hence good separation of the L and R output signals over the entire audio-frequency range.

Now referring to the drawing, an antenna 11 picks up the FM stereo signal in a normal manner, and applies it to an FM receiver circuit 12 which normally includes a mixer circuit, intermediate amplifier stages, and a demodulator of the limiter-discriminator type or ratio-detector type. The output of the FM receiver 12 comprises, at the output terminal 13 thereof, the composite signal which comprises the L+R signal combination in a range of some 50 to 15,000 cycles per second, a pilot signal (at 19 kilocycles per the FCC standards) and L—R sidebands of a suppressed amplitude modulated subcarrier, these sidebands extending between 23 kc./s. and 53 kc./s. The signal at output terminal 13 also might include a commercial program signal in the vicinity of 67 kc. The signals are fed, from terminal 13, through a 67 kc. reject filter 14 which rejects the commercial program signal, and the FM stereo composite signal then is fed through a coupling capacitor 16 to a control electrode 17 of an amplifier device 18 which may be of the vacuum tube type.

The stereo composite signal also is fed, via the coupling capacitor 16, through a pilot signal pass filter 21 which passes only the 19 kc. pilot signal, and this pilot signal is applied to a subcarrier switching generator 22 which may be a synchronous oscillator or other circuit arrangement for doubling the frequency of the 19 kc. and producing a 38 kc. switching signal under the control of the 19 kc. pilot signal. An output tuned circuit of the switching generator 22, shown as comprising a tuned circuit having a capacitor 23 connected in parallel with an inductor 24, is inductively coupled to a winding 26.

A potentiometer 28 is connected between a cathode 31 of tube 18 and electrical ground. A resistor 32 is connected between the control grid 17 and electrical ground. A load resistor 37 is connected between the anode 36 and a terminal 38 of B+ operating voltage of which the negative terminal 39 is electrically grounded. A coupling capacitor 41 is connected between the anode 36 and a center tap 42 of the winding 26.

The stereo demodulator circuit, which in the embodiment shown in the drawing is of the time-sampling type, includes a "left" signal sampling circuit comprising a pair of diodes 46, 47 having unlike electrodes connected respectively to the ends of the winding 26. A pair of load resistors 48, 49 are connected in series between the remaining electrodes of the diodes 46, 47, and a resistor 51 and is connected between the junction of the resistors 48, 49, and a left signal output terminal 52. A capacitor 53 is connected between the terminal 52 and ground, and, in conjunction with the resistor 51, forms a conventional de-emphasis circuit for the audio signal. A resistor 54 is connected between the output terminal 52 and electrical ground, to provide a discharge path for the capacitor 53.

Similarly, a "right" signal sampling circuit comprises a pair of diodes 61, 62 having unlike electrodes connected respectively to the ends of the winding 26, these electrodes being unlike the electrodes of the diodes 46, 47 which are connected to the winding 26, as shown. Load resistors 63 and 64 are connected in series between the remaining electrodes of the diodes 61 and 62, and a resistor 66 is connected between a "right" signal output terminal 67 and the junction of resistors 63 and 64. A capacitor 68 is connected between the right signal output terminal 67 and electrical ground and, in conjunction with the resistor 66, provides a well-known de-emphasis circuit for the "right" stereo output signal. A resistor 69 is connected between the terminal 67 and electrical ground, to provide a discharge path for the capacitor 68.

The circuit thus far described has previously been known, and functions as follows. The stereo composite signal is amplified by the amplifier device 18, and is applied through the capacitor 41 to the center tap 42 of the winding 26 of the sampling circuit. The subcarrier switching generator 22, under control of the pilot signal which is selectively passed by the filter 21, produces a 38 kc. switching signal at the tuned circuit 23–24, and this switching signal is inductively coupled to the winding 26. During the half-cycles of this switching signal when the upper end of winding 26 is positive and the lower end thereof is negative, both of the diodes 46 and 47 will be biased into a conductive condition, whereupon the composite signal passes through the two halves of the secondary winding 26, and through the respective diodes 46, 47 and the resistors 48, 49, to the de-emphasis network comprising resistor 51 and capacitor 53. If the sampling signal is properly phased with respect to the suppressed subcarrier, as is well-known to those skilled in art, this sampling of the composite signal during a half-cycle of switching voltage, will provide a "left" stereo signal at the output terminal 52.

During the other half-cycles of the switching signal, i.e., when the upper end of winding 26 is negative and the lower end thereof is positive, both of the diodes 61 and 62 will be rendered conductive, whereupon the composite signal will pass through the respective halves of the winding 26, from the input center tap 42 thereof, and through the diodes 61 and 62 and resistors 63 and 64, respectively, to the de-emphasis network 66–68, thereby providing a sample of the "right" stereo signal at the output terminal 67, in a manner well-known to those skilled in the art.

In this circuit, the left output signal will be contaminated with some R signal, and the R output signal will be contaminated with a certain amount of the left signal.

The amount of this undesired contamination is different at different audio frequencies, and is generally worse at the higher audio frequencies. The differences in stereo separation at different audio frequencies is largely due to non-linear characteristics of certain circuitry. For example the FM receiver 12 and the 67 kc. reject filter 14 each have a non-linear phase characteristic with respect to audio frequency.

In accordance with the present invention, a signal cancellation network arrangement achieves cancellation of the undesired R and L output signal components, and hence good stereo signal separation, over the entire audio frequency range. In a preferred embodiment, a coupling capacitor 70 of sufficient value to pass signals in the entire audio frequency range, is connected between the adjustable tap 29 of the potentiometer 28 and the inputs of two signal cancellation networks. One of these networks comprises a capacitor 71 and a resistor 73 connected in parallel between the capacitor 70 and the "left" signal terminal 52, and the other network comprises a capacitor 72 and a resistor 74 connected in parallel between the capacitor 70 and the "right" signal terminal 67, as shown. The values of these capacitors 71 and 72 are sufficiently small so that only the higher audio frequencies, for example above 5,000 cycles per second, pass through them to the output terminals 52 and 67, whereas signals in the entire audio frequency range pass through the resistors 73 and 74, but with reduced amplitude. Thus, the networks 71, 73 and 72, 74 each have the characteristic of passing the higher audio frequency signal components with greater amplitude than the lower audio frequency signal components. The ratio of the high to low frequencies passed by the networks depends on the relative values of capacitance and resistance. The audio signal appearing at the potentiometer tap 29 is a $-(L+R)$ signal, for example and for the purpose of this invention, since the $L-R$ sidebands are in a frequency range above audibility, and also become substantially filtered out and eliminated by the capacitors 53 and 68. For the purposes of this invention, the phase of the signal at the potentiometer tap 29 compared to the phase of the stereo output signals at output terminals 52 and 67, is relative, the important thing being that the $L+R$ signal at potentiometer tap 29 should be of opposite polarity to that of the stereo output signals at terminals 52 and 67. In the example, at the terminal 52, the $-(L+R)$ signal as passed by the network 71, 73 combines with the L output signal and the undesired amount of R signal, so as to cancel out and eliminate the undesired R signal component, thus leaving a substantially "pure" L output signal at the terminal 52, this resulting L output signal being only slightly reduced in amplitude due to the cancellation process. Similarly, the $-(L+R)$ signal as passed by the network 72, 74 to the right signal output terminal 67, causes cancellation of the undesired small amount of left signal at this terminal, thereby leaving a substantially "pure" right signal which has been only slightly attenuated by the cancellation process. By this process, the L and R output signals will be attenuated slightly more at the higher audio frequencies than at the lower audio frequencies. This normally is not bothersome; however, if desired, these attenuated higher frequencies can be relatively increased in amplitude by slightly decreasing the values of the de-emphasis capacitors 53 and 68, to achieve an overall "flat" audio response with respect to frequency for the stereo output signals.

The adjustable tap 29 of the potentiometer 28 is adjusted to provide the best stereo separation, by applying the optimum amount of $-(L+R)$ cancellation signal to the L and R output terminals 52 and 67, the relative values of capacitance and resistance in the networks 71, 73 and 72, 74 being chosen to provide the proper characteristic of greater passage of the higher frequency components than the lower frequency components of the cancellation signal, as described above. An alternative approach is to adjust the tap 29 for good stereo separation at about 1 kc./s., with the capacitors 71 and 72 absent, and then add the capacitors 71 and 72 of such values as to provide for good stereo separation at about 10 kc./s.

When the invention is applied to a stereo receiver circuit having the AM detector and matrix type of stereo demodulator, in which the $L+R$ and $L-R$ signals are applied to the matrix, the cancellation network of the invention may be connected in the path of either the $L+R$ or $L-R$ signal as required, to achieve good stereo separation of the L and R output signals over the entire frequency range.

From the foregoing description it will be seen that my invention achieves improved separation or purity of the stereo output signals, over the entire audio frequency range.

While a preferred embodiment of the invention has been shown and described, various other embodiments and modifications thereof will be apparent to those skilled in the art, and will fall within the scope of invention as defined in the following claims.

What I claim is:

1. In a reception circuit having a stereo demodulator circuit for deriving L and R stereo output signals from a composite signal comprising an $L+R$ component and $L-R$ sidebands, in which the L output signal tends to contain an undesired component of R signal and the R output signal tends to contain an undesired component of L signal, said undesired components having relatively greater amplitudes of relatively higher audio frequencies, means for improving the stereo separation of said L and R output signals, comprising a signal cancellation network arrangement connected to apply an arithmetical combination of L and R signals which is derived from the composite signal to said L and R output signals in a phase tending to cancel said undesired components, said network arrangement having the characteristic of passing the higher audio frequencies with greater amplitude than the lower audio frequencies, whereby good stereo separation of the L and R output signals is achieved over the entire audio frequency range.

2. In a reception circuit having a stereo demodulator circuit for deriving L and R stereo output signals from a composite signal comprising an $L+R$ component and $L-R$ sidebands, in which the L output signal tends to contain an undesired component of R signal and the R output signal tends to contain an undesired component of L signal, said undesired components having relatively greater amplitudes at relatively higher audio frequencies, means for improving the stereo separation of said L and R output signals, comprising a pair of networks respectively connected to apply said $L+R$ component to said L and R output signals in a phase tending to cause cancellation of said undesired components, each of said networks comprising a capacitor and a resistor connected in parallel, the resistors of said networks having values of resistance to cause substantially complete cancellation of said undesired components at the lower audio frequencies, and said capacitors having values of capacitance to pass only the higher audio frequencies thereby causing substantially complete cancellation of said undesired components at the higher audio frequencies, whereby good stereo separation of the L and R output signals is achieved over the entire audio frequency range.

3. In a reception circuit having a stereo demodulator circuit for deriving L and R stereo output signals from a composite signal comprising an $L+R$ component and $L-R$ sidebands, in which the L output signal tends to contain an undesired component of R signal and the R output signal tends to contain an undesired component of L signal, said undesired components having relatively greater amplitudes at relatively higher audio frequencies, means for improving the stereo separation of said L and R output signals, comprising a pair of networks respectively connected to apply said $L+R$ component to said L and R output signals in a phase tending to cause cancellation of said undesired components, each of said networks comprising a capacitor and a resistor connected in parallel, the values of resistance and capacitance of the networks being such as to provide a signal-passing characteristic with respect to frequency that is similar to the amplitude versus frequency characteristic of said undesired signal components, and means to adjust the amplitude of said $L+R$ component applied to said networks to cause substantially complete cancellation of said undesired components, whereby good stereo separation of the L and R output signals is achieved over the entire audio frequency range.

4. In a reception circuit having a stereo demodulator circuit for deriving L and R stereo output signals from a composite signal comprising an $L+R$ signal component and $L-R$ sidebands, in which the L output signal tends to contain an undesired component of R signal and the R output signal tends to contain an undesired component of L signal, said undesired components having relatively greater amplitudes at relatively higher audio frequencies, means for improving the stereo separation of said L and R output signals, comprising a phase-inverting amplifier for said composite signal and adapted to provide the composite signal in a first phase and in an inverted phase, means to apply said composite signal in the first phase to said stereo demodulator circuit, a potentiometer, means to apply said composite signal in inverted phase to said potentiometer, and a pair of networks respectively connected to apply the signal from the adjustable tap of said potentiometer to said L and R output signals, each of said networks comprising a capacitor and a resistor connected in parallel, the values of resistance and capacitance of the networks being such as to provide a signal-passing characteristic with respect to frequency that is similar to the amplitude versus frequency characteristic of said undesired signal components, whereby proper adjustment of said adjustable tap can cause substantially complete cancellation of said undesired components thereby achieving good stereo separation of the L and R output signals over the entire audio frequency range.

References Cited by the Examiner

UNITED STATES PATENTS 3,167,615 1/1965 Wilhelm ------------ 179—15

DAVID G. REDINBAUGH, *Primary Examiner.*

R. L. GRIFFIN, *Assistant Examiner.*